(12) United States Patent
Verhagen et al.

(10) Patent No.: US 7,092,592 B2
(45) Date of Patent: Aug. 15, 2006

(54) OPTICAL CROSS CONNECT

(75) Inventors: Robert Verhagen, Schiindel (NL); Willy Rietveld, Benshop (NL)

(73) Assignee: Tyco Electronics Nederland B.V., Hertogenbosch (NL)

( * ) Notice: Subject to any disclaimer, the term of this patent is extended or adjusted under 35 U.S.C. 154(b) by 0 days.

(21) Appl. No.: 10/466,512

(22) PCT Filed: Jan. 17, 2002

(86) PCT No.: PCT/US02/01688

§ 371 (c)(1),
(2), (4) Date: Feb. 6, 2004

(87) PCT Pub. No.: WO02/057829

PCT Pub. Date: Jul. 25, 2002

(65) Prior Publication Data

US 2004/0179771 A1    Sep. 16, 2004

Related U.S. Application Data

(60) Provisional application No. 60/262,307, filed on Jan. 17, 2001.

(51) Int. Cl.
*G02B 6/26*  (2006.01)
*G02B 6/28*  (2006.01)

(52) U.S. Cl. ............................. 385/17; 385/14; 385/24

(58) Field of Classification Search ............. 385/14–24
See application file for complete search history.

(56) References Cited

U.S. PATENT DOCUMENTS 5,020,871 A * 6/1991 Nishimura .................... 385/24
6,154,587 A * 11/2000 Okayama ..................... 385/24

* cited by examiner

*Primary Examiner*—Michelle Connelly-Cushwa (57) ABSTRACT

An optical cross-connect system (30) for interconnecting optical pathways of a horizontal node with each vertical node, the system comprising a three dimensional array of optical pathways in which one end of each optical pathway is presented on a first face (31), and the other end of each optical pathway is presented on a second face (32) such that the first and second faces (31 and 32) present rows and columns of optical pathway groupings, and wherein the horizontal nodes are defined along the rows of the first face (31) and the vertical nodes are defined along the columns of the second face (32).

30 Claims, 10 Drawing Sheets

| Horizontal Node | Fiber Register | Optical Pathway Interconnections | Fiber Register | Vertical Node |
|---|---|---|---|---|
| N(xm-m)+1 | $F_{N(xm-m)+1,1}$ | | $F_{N(xm-m)+1,1}$ | N'1 |
| | $F_{N(xm-m)+1,2}$ | | $F_{N(xm-m)+2,1}$ | |
| | ⋮ | | ⋮ | |
| | $F_{N(xm-m)+1,m}$ | | $F_{Nxm,1}$ | |
| | $F_{N(xm-m)+1,m+1}$ | | $F_{N(xm-m)+1,2}$ | N'2 |
| | $F_{N(xm-m)+1,m+2}$ | | $F_{N(xm-m)+2,2}$ | |
| | ⋮ | | ⋮ | |
| | $F_{N(xm-m)+1,1+2m}$ | | $F_{Nm,2}$ | |
| | ⋮ | | ⋮ | ⋮ |
| | $F_{N(xm-m)+1,(m-1)m}$ | | $F_{N(xm-m)+1,m}$ | N'm |
| | $F_{N(xm-m)+1,(m-1)m+1}$ | | $F_{N(xm-m)+2,m}$ | |
| | ⋮ | | ⋮ | |
| | $F_{N(xm-m)+1,a}$ | | $F_{Nm,m}$ | |
| N(xm-m)+2 | $F_{N(xm-m)+2,1}$ | | $F_{N(xm-m)+1,m+1}$ | N'm+1 |
| | $F_{N(xm-m)+2,2}$ | | $F_{N(xm-m)+2,m+1}$ | |
| | ⋮ | | | |
| | $F_{N(xm-m)+2,m}$ | | $F_{Nxm,m+1}$ | |
| | ⋮ | | | N'(m+2) through N'(n-1) |
| | $F_{N(xm-m)+2,n}$ | | | |
| N(xm-m)+3 through Nx(m-1) | ⋮ | | | |
| Nxm | $F_{Nm,1}$ | | | |
| | $F_{Nm,3}$ | | | |
| | ⋮ | | $F_{N(xm-m)+1,n}$ | N'n |
| | $F_{Nm,m}$ | | $F_{N(xm-m)+2,n}$ | |
| | $F_{Nm,m+1}$ | | ⋮ | |
| | ⋮ | | | |
| | $F_{Nm,n}$ | | $F_{Nm,n}$ | |

FIG. 10

| Cell | Subcell | | Subunit | Unit |
|---|---|---|---|---|
| 1 (Horizontal node) | 1st position | | 1st V node | 1st position |
| | 2nd position | | 2nd V node | |
| | 3rd position | | ⋮ | |
| | ⋮ | | | |
| | mth position | | mth position | |
| 2 (Horizontal node) | 1st position | | | 2nd position |
| | 2nd position | | | |
| | 3rd position | | | |
| | ⋮ | | ⋮ | |
| | mth position | | 2mth V node | |
| 3 (Horizontal node) | 1st position | | | 3rd position |
| | 2nd position | | | |
| | 3rd position | | | |
| | ⋮ | | ⋮ | |
| | mth position | | 3mth V node | |
| ⋮ | ⋮ | | ⋮ | ⋮ |
| m (Horizontal node) | 1 | | | mth position |
| | 2 | | | |
| | 3 | | | |
| | ⋮ | | ⋮ | |
| | mth position | | nth position | |

FIG. 11

OPTICAL CROSS CONNECT

REFERENCE TO A RELATED APPLICATION

This application is based on U.S. Provisional Application No. 60/262,307, filed Jan. 17, 2001, which is hereby incorporated by reference in its entirety, including its appendix.

FIELD OF INVENTION

The present invention related generally to optical cross connects, and, more specifically, to an optical cross connect which is scalable.

BACKGROUND OF THE INVENTION

As used herein, the term "optical cross connect" refers generally to any device that optically interconnects groupings or "nodes" of fibers with other "nodes" of fibers. The term "perfect shuffle" as used herein refers to a particular configuration of an optic cross-connect in which each output node contains a fiber from each input node. As used herein, the terms "input node" and "output node" are used for illustrative purposes to provide a distinction between the two sets of nodes. It should be understood, however, that this designation should not limit the invention to a particular direction of propagation of light through the nodes. For example, it is well recognized that an input in a cross-connect may be considered an output if the direction of propagation of light changes, thus, in practice, what is referred to, as an input node may actually be a node through which light exists.

Figure 1:
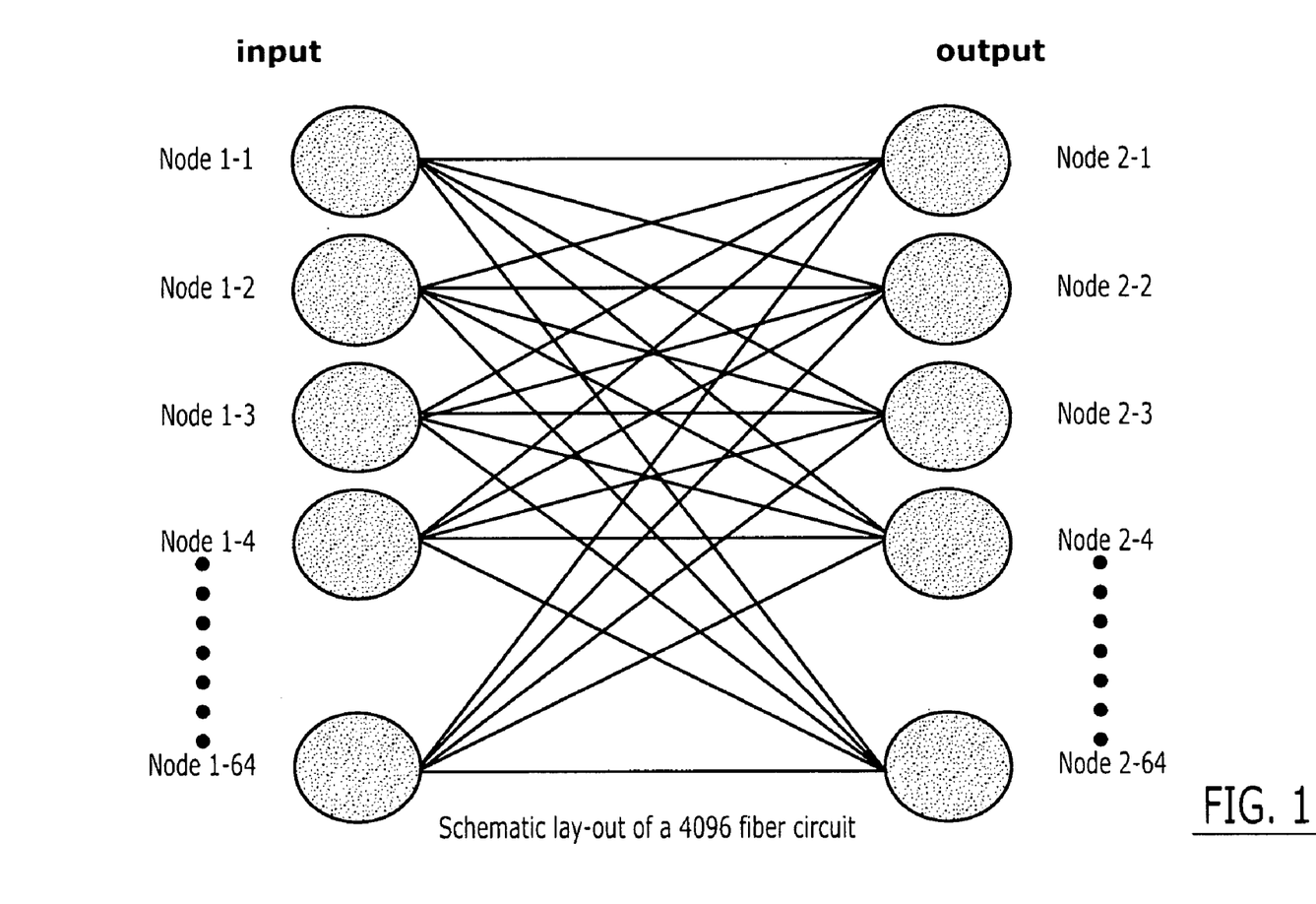
FIG. 1 is a schematic illustrating theory of a perfect shuffle.

The concept of a perfect shuffle is shown systematically in FIG. 1. As shown, input nodes 1-1 through 1-64 are interconnected with each of the output nodes 2-1 through 2-64. For simplicity, the interconnections of nodes 1-5 through 1-63 and 2-5 through 2-63 have been eliminated from the figure. Additionally, it should be understood that, in a prefect shuffle, each node would be connected to 64 other nodes as opposed to merely the five as shown in the FIG. 1. In such a design, all input nodes must be able to communicate with each output node. Thus, the number of interconnections for each node is equivalent to the number of nodes. For example, to effect the interconnection of 8 input nodes to 8 output nodes, there must be 8 interconnections per node.

Figure 2:
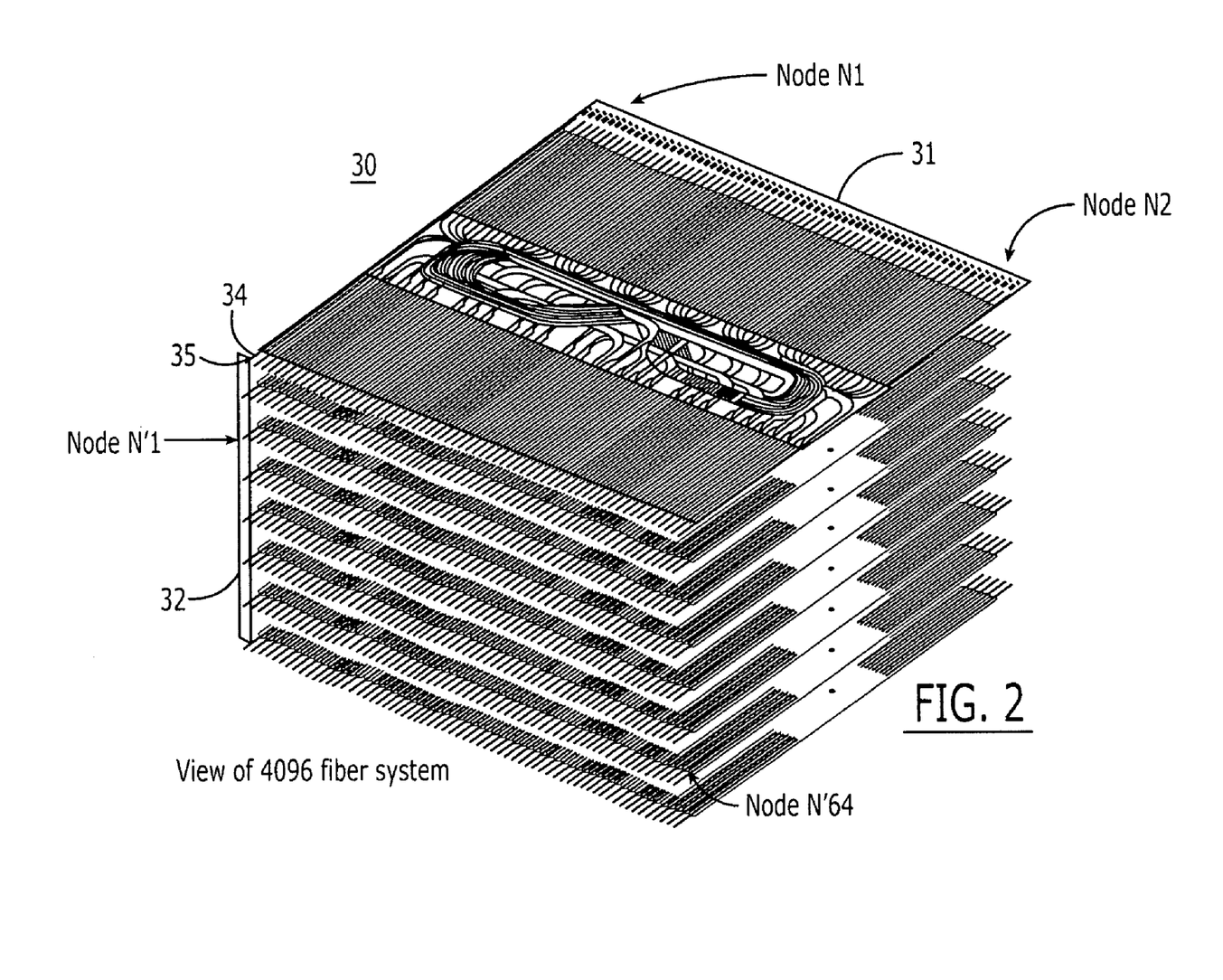
FIG. 2 is a schematic illustrating the various applications for optical cross connects.

The number of nodes and thus the number of interconnections therewith depend upon the particular application of the optical cross-connect. For example, applicants have identified that optical cross connects are particularly well suited for switching in dense wavelength division multiplex (DWDM) networks as found in mesh/ring long-distance networks, metro rings, and feeder rings. In such applications, a network fiber may contain many channels of optical signals with each channel propagating at a different wavelength. To effect switching, these channels must be separated or "de-multiplexed," such that each channel propagates on a dedicated fiber. At this point, each fiber can be interconnected from one input node to each of the output nodes. The various channels contained on discrete fibers corresponding to a particular output node are then combined or "multiplexed" on to a fiber to again achieve a DWDM transmission. Aside from these DWDM applications, applicants have identified also that optical cross-connects can be used in such switching applications as routers. A schematic diagram of the various applications for optical cross connects are shown in FIG. 2.

In addition to these applications, applicants envision using an optical cross connect for interconnecting processors or other components within a computer.

Traditional approaches for interconnecting optical nodes typically involve a hybrid optoelectric configuration. More specifically, rather than interconnecting the various nodes in the optical domain, optical signals are converted to electrical signals, electrically switched, and then converted back to optical signals.

The traditional optoelectric approach for interconnecting optical nodes has a number of shortcomings. First, the fact that optical signals are converted to electrical signals and then back to optical signals necessarily requires components for affecting the electrical/optical conversion. These additional components tend to make the optical cross connect large and expensive. Additionally, the additional components compromise the efficiency of the overall system thereby requiring higher energy input signals and increased reliance on optical amplifiers to raise the input signals to the appropriate level. Finally, by converting between the optical and electrical domains and switching in the electrical domain, optoelectric cross-connects are slower and encounter electrical historesis which limits the speed of switching. Therefore, although used traditionally, the optoelectric approach to cross connects is faced with inherent problems.

Recently, the applicants have developed a purely optical cross-connect. This cross connect involves an 8 node by 8 node perfect shuffle described in co-pending application No. 60/188,427 filed on Mar. 10, 2000. Briefly, the 8×8 perfect shuffle optical circuit comprises a substrate upon which is laid optical fiber that interconnects each input node with each output node. Since this is an 8×8 cross-connect, each node comprises 8 individual fibers. The fibers extending from the tabs are typically terminated in a multi-fiber ferrule for connection to a multiplexer or demultiplexer or are terminated individually for interconnection with particular active or passive devices. An example of a multi-fiber ferrule is the Lightray MPX™ connector interconnect system commercially available through Tyco Electronics (Harrisburg, Pa.).

The purely optical cross-connect offers a number of advantages over an optoelectric equivalent. Specifically, because the nodes are interconnected purely in the optical domain, components used for converting optical signals to electrical and then back again are eliminated. This reduces costs, complexity and increases efficiency.

Although the optical cross-connect as described above offers significant advantages over optoelectric devices and overcomes many of their shortcomings, trends in the industry somewhat militate against its general acceptance. More specifically, there is an ever-increasing need for greater capacity, i.e., more nodes, especially as the number of channels in DWDM applications continues to increase. In addition to increased capacity, there is a need to reduce size. Therefore, there is a general trend in the industry to increase the node density within an optical cross-connect. Furthermore, despite these trends, there is no "standard" industry cross-connect. Different applications require different configurations and node capacity.

The applicants have identified a number of issues which somewhat restrict the ability of the optical circuit described above to meet current industry trends. Specifically, the current optical circuit design is essentially flat and the nodes are defined in basically two dimensions. Applicants recognize that as the number of nodes increases from 8 up through 64 and beyond, the area required to accommodate the flat fiber circuit and the complexity of the fiber layouts thereon become prohibitive. Additionally, designing and manufacturing specific optical circuits to meet particular application needs is impractical. Specifically, designing an optical circuit layout requires attention to a variety of factors including minimum bend radius, skew, plus other problems, such as minimizing fiber stacking and securing fibers to a substrate. It is impractical that specific optical circuits be designed and manufactured according to specific applications.

Therefore, a need exists for an optical cross-connect that not only accommodates many nodes in a compact package, but also affords flexibility in configuring the capacity of the cross-connect to meet a variety of different application needs. The present invention fulfills this need among others.

SUMMARY OF INVENTION

The present invention provides for a high-density, high-capacity modular optical cross-connect that is scalable to a user's particular application. Applicants recognize that by forming the cross-connect from similar modules, it can be sized to a particular need using modular components in the form of stackable trays and optical circuits contained within the trays. The optical circuits themselves can be relatively few in design and based upon reliable technology. Additionally, applicants recognize that by configuring the input nodes perpendicular to the output nodes, the optical cross-connect can be defined in three dimensions instead of two thereby increasing node density.

In a preferred embodiment, the optical cross-connect comprises comprising a three-dimensional array of fibers in which one end of each fiber is presented on a first face, and the other end of each fiber is presented on a second face such that the first and second faces present rows and columns of groupings of fibers and wherein the input nodes are defined along the rows of the first face and the output nodes are defined along the columns of the second face. Preferably, the rows are contained within removable trays to impart versatility to the system.

DETAILED DESCRIPTION

Figures 3, 4:
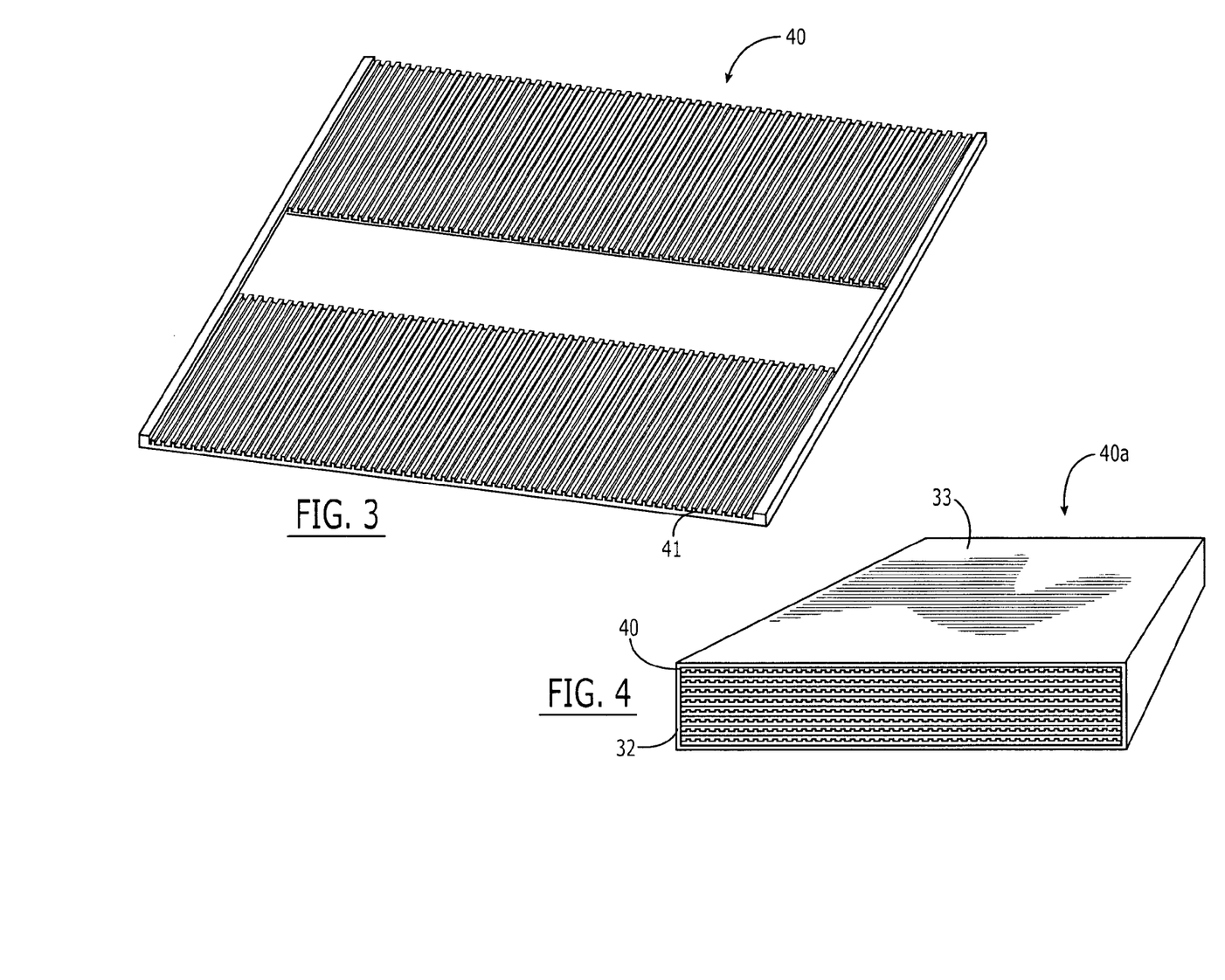
FIG. 3 shows a scaled-up, eight-tray, 64×64 node optical cross connect of the present invention.
FIG. 4 shows a preferred embodiment of the substrate a tray of the optical cross connect of FIG. 3.

Referring to FIGS. 3 through 9, a preferred embodiment of the optical cross connect of the present invention and its components are shown. FIG. 3 shows a preferred embodiment of a 64×64 node, 4,096 fiber perfect shuffle. Although the depicted system comprises 64×64 nodes, it should be understood that the present invention is not limited to a particular cross-connect configuration. Indeed, the configurability of the optical cross-connect is an important feature of the invention. The optical cross-connect can be figured to meet any desired node interconnection, for example, 8×8, 16×16, 32×32 and as shown 64×64, as discussed below.

As shown in FIG. 3, the optical cross-connect system 30 comprises a three-dimensional array of interconnected fibers 31. The fibers are arranged so that their ends are presented essentially on two different faces, 32, 33, of the three-dimensional array. It should be understood that the term "face," as used herein, is not intended to imply that all of the ends are in the same plane on a particular face. The first and second faces, 32, 33 of the fiber array contain a matrix of rows and columns of fibers. The first face 32 defines nodes along columns of the matrix while the other face defines nodes along the rows of the matrix. Whether a node is defined along a column or row depends upon the layout of the individual optical circuits as discussed below.

In this embodiment, each node comprises a selection of various tabs 34 while each tab 34 contains a subgrouping of fibers 35 of a particular node. As shown in FIG. 1 the tabs 34 are aligned so that nodes are defined along columns on the first face 32 and along rows on the second face 33. Although it is highly preferred to have the tabs aligned so that the nodes may be defined by contiguous tabs along either the columns or rows, it is not necessary. Instead, various tabs may be grouped into their respective nodes through a network of fiber interconnections. Such interconnections, however, are likely to become prohibitively complex as the number of nodes, and thus tabs within each node, increases.

By inverting the configuration of the nodes on either face of the fiber array 31, significant advantages can be realized. First, since the array is a three-dimensional structure, the nodes are no longer defined along a two-dimensional plane. Consequently, a large area is no longer necessary to accommodate a large number of nodes. Furthermore, aside from minimizing area, the three-dimensional approach facilitates interconnections between rows. If such connections needed to be made in a flat, two-dimensional fiber array, the interconnections would be exceedingly complex, particularly as the number of nodes increased. Still another advantage of the three-dimensional approach, is that it facilitates stackability and thus scaling using trays. Specifically, every time a tray is added another row is added to the matrix. Providing that there are also additional columns on the other trays to interconnect with the fibers introduced by the new row, i.e., providing that there are additional columns as well, the overall capacity of the system is increased. The additional fibers for the column may be already present in the existing trays (i.e., the trays are built with future capacity in mind), or additional optical circuits may be added to the existing trays to accommodate the additional capacity offered by the addition of a new tray.

The preferred protocol for laying out the trays will now be considered. In describing the protocol, reference is first made to FIGS. 10 and 11 which provide "generic" fiber register and positioning information for scalable optical cross connects of any dimension. Following this analysis, a particular embodiment of the optical cross connect will be considered with respect to FIGS. 5–8.

Figure 10:
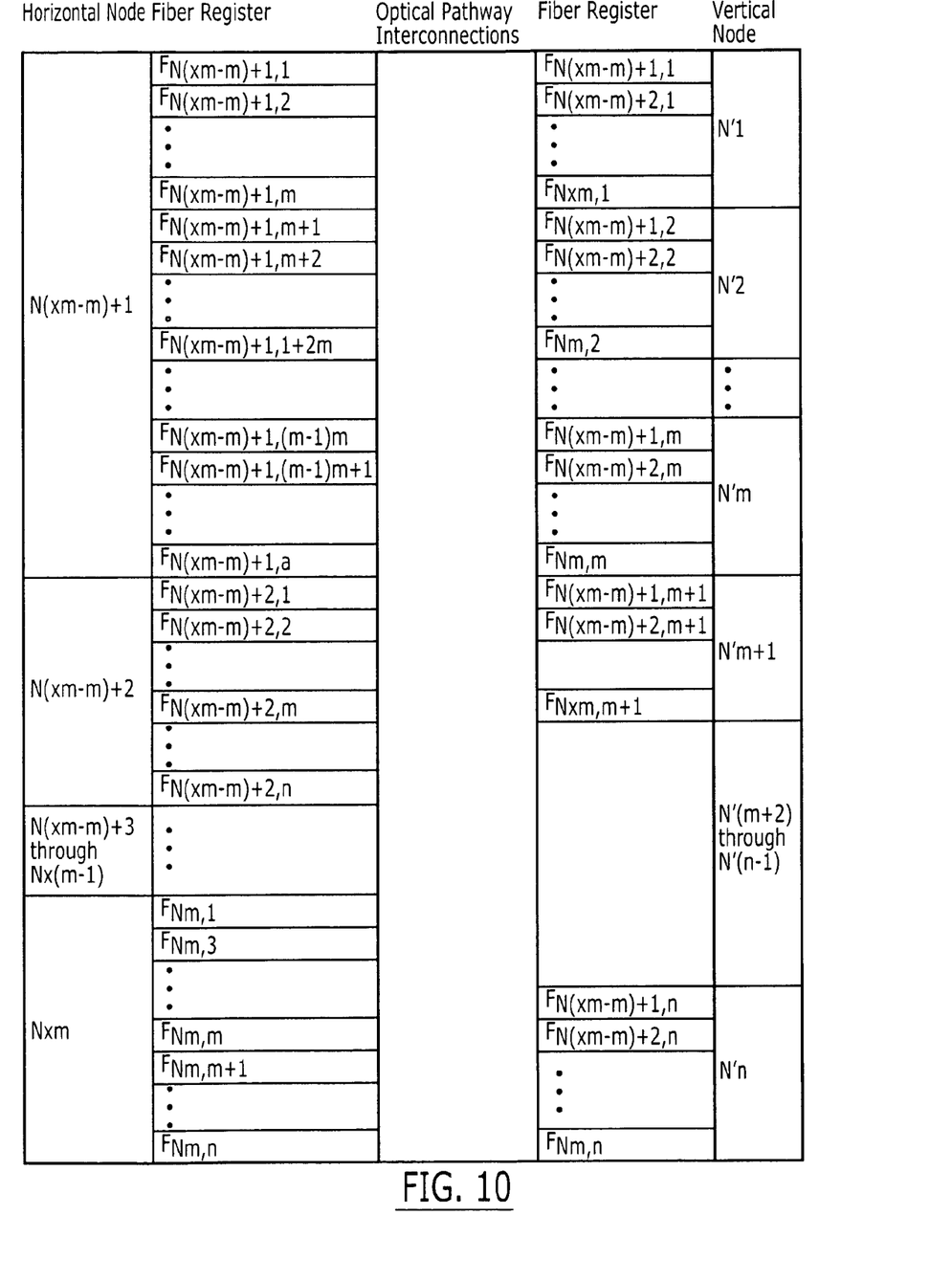
FIG. 10 is a schematic of the optical pathway layout in a tray.

Referring to FIG. 10, a preferred optical circuit layout of the individuals trays will be explained. The purpose of this explanation is to show the interrelationship of the fibers and to provide an accounting of the fibers between the horizontal and vertical nodes. It should be understood that reference to horizontal and vertical nodes is made for illustrative purposes and should not be used to limit the scope of the invention. For example, it should be obvious that the terms "horizontal" and "vertical" are relative and dependent upon one's perspective. Thus, it should be understood that if one rotates one's perspective of the device, a horizontal node may become vertical and a vertical node may be horizontal. For that matter, although one generally thinks of a tray as being horizontal, it is quite possible that the trays may be hanging and have a vertical orientation.

Figure 11:
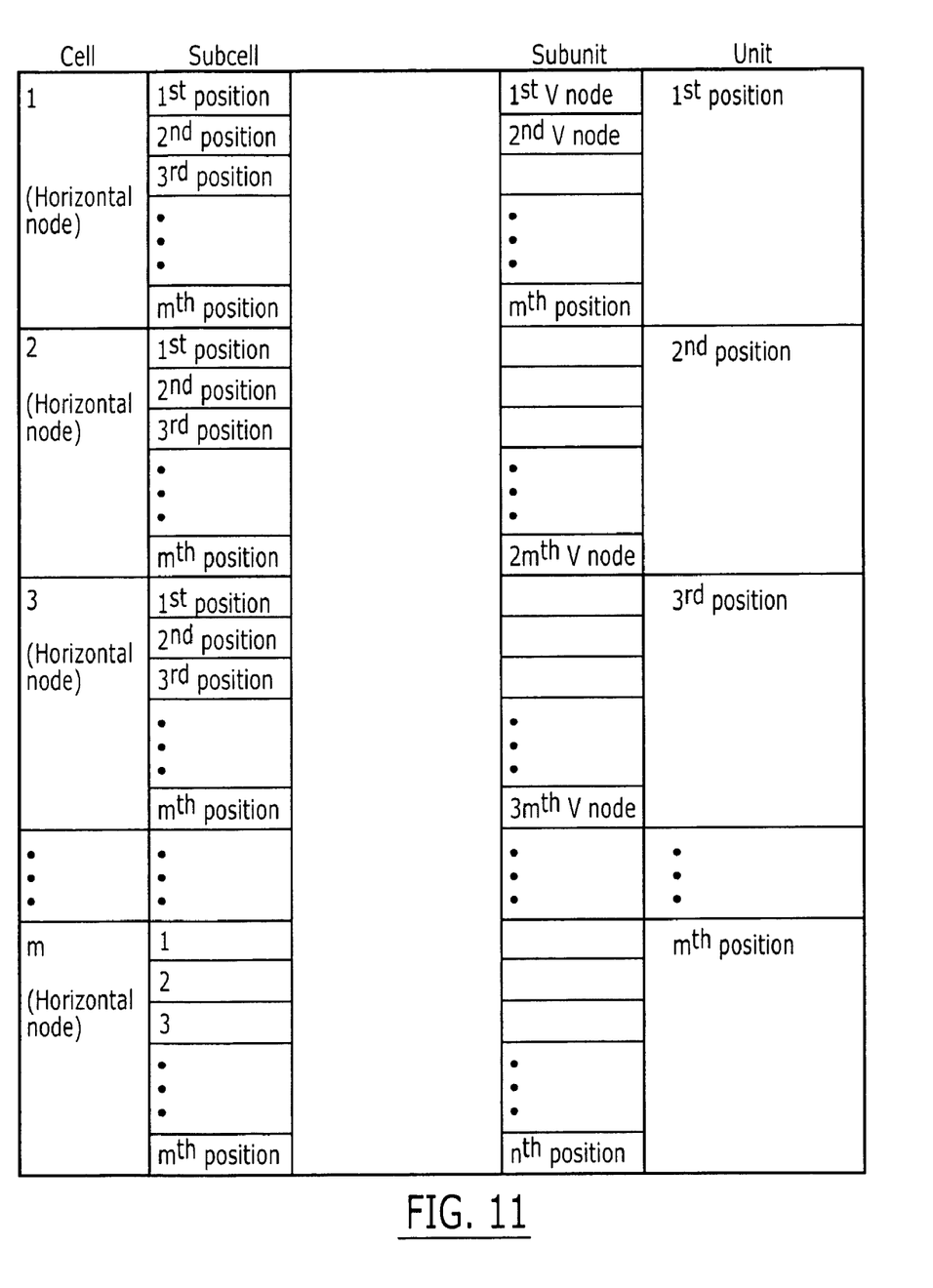
FIG. 11 is a schematic of the zones in a tray.

In FIG. 11, a fully populated tray is shown in which every optical pathway position is occupied. For purposes of explanation, we will assume that the optical pathway is a fiber, although it should be understood that this invention is not limited to fibers, and other optical pathways may be used such a silica waveguide in a substrate.

In this tray, there are opposing first and second faces which present the horizontal nodes and the vertical nodes. It should be understood that the faces need not be opposite, and may be on the same plane or orthogonal to one another. Indeed, given the compliant nature of fiber, the fibers can be routed in any number of ways to cross connect the horizontal and vertical nodes. Along the first face, horizontal nodes are numbered from N(xm−m)+1 to Nm, while along the second face, vertical nodes are number N'1 to N'n. The parameter "m" denotes the number of horizontal nodes found in a tray and is typically the maximum number of trays that can be stacked. The parameter "x" denotes the particular tray number which ranges form 1 to m. For example, if eight trays are stacked the tray numbers will range from 1 to 8. The parameter "n" denotes the total number of horizontal/vertical nodes in the system (i.e, n horizontal nodes and n vertical nodes for a system assuming a perfect shuffle).

By way of convention, each fiber position (denoted "F") of a given tray is designated according to the horizontal node to which it corresponds. It should be understood, however, that the fibers could alternatively be characterized according to the vertical node to which they connect since every fiber is connected to a specific horizontal node and a specific vertical node. The following nomenclature is used to describe fiber position within the tray:

$$F_{(horizontal\ node),\ (position\ within\ the\ node)}.$$

For example, assuming x=3, m=8, n=64, the $F_{N(xm-m)+2,2}$ position would correspond to $F_{18,2}$. By examining the register numbers of the horizontal and vertical nodes, it becomes apparent that the "horizontal node" variable dictates which horizontal node the fiber corresponds to, while the "position within the node" variable dictates which vertical node the fiber corresponds to. It should also be apparent that a vertical node of a tray only comprises a single layer of that node. The vertical node is not completed unless all the trays of the system are stacked. In other words, a single tray only comprises m/n of the fibers of a given vertical node. Therefore, n/m trays are needed to complete the preferred optical cross connect of the present invention. It is worthwhile to note that if n=m, then a single tray would make up the complete system and thus a single tray would comprise an entire vertical node.

As mentioned above, a fiber position has been assigned to each vertical and horizontal node for purposes of fiber accountability so that one can readily see the correspondence of a particular fiber between the horizontal and vertical nodes. It should be understood, however, that as far as the optical cross connects functionality is concerned, it makes no difference where the fibers reside in a particular node. In other words, the position of a fiber within a node may be rearranged without affecting the performance of the cross connect system. In fact, it may be preferable to rearrange the positions of the fibers within the nodes in order to optimize fiber layout objectives such as minimizing skew and stacking of fibers.

The configuration of the fiber circuits used to effect the cross connection of horizontal and vertical nodes is important to optimize the scalability of the system. That is, it is desirable to add not only trays to the system to increase its capacity, but also optical circuits to the system as the need for increased capacity arises. This way, optical circuits are not wasted on systems operating under capacity. To this end, it is preferable to modularize the optical circuits, and, even more preferable, to minimize the number of different modular optical circuits used.

Referring to FIG. 11, the optical circuits will be described with respect to the node/fiber locations. Each circuit preferably comprises an m number of fibers for m number of horizontal nodes and a layer of m number of fibers for m number of vertical nodes. Since each tray comprises m horizontal nodes having n number of fibers and a layer of n number of vertical nodes having m number of fibers, each optical circuit therefore preferably comprises m/n number of fibers for each horizontal node in the tray and an entire layer of fibers for m/n number of vertical nodes of the system.

By partitioning or modularizing the optical circuits in this way, the optical circuit can be layered among themselves within a given tray to increase system capacity. Specifically, applicants recognize that by specifically positioning groupings of fibers of the horizontal and vertical nodes, the optical circuits can be stacked such that m fiber groupings of different optical circuits corresponding to the same horizontal node will be contiguous, and the m fiber grouping of different optical circuit corresponding to layers of the vertical nodes will be sequential.

To this end, the horizontal node face is divided into m number of cells, each cell corresponding to a horizontal node. Each cell is then divided into m number of subcells, each subcell corresponding to a position for a grouping of m fibers. By way of nomenclature, the subcells have $1^{st}$, $2^{nd}$, $3^{rd}$ . . . and $m^{th}$ positions within any given cell. The vertical node face is divided into m number of units which are further divided into m number of subunits. Each subunit corresponds to a layer of a vertical node which in turn corresponds to a grouping of m number of fibers. By way of nomenclature, the units have $1^{st}$, $2^{nd}$, $3^{rd}$ . . . and $m^{th}$ positions within any given tray.

In the preferred embodiment, each optical circuit comprises m number of subcells, one subcell corresponding to each cell and having the same relative position within its respective cell as the other subcells of the circuit. The circuit also comprises an entire unit of m number of subunits in a particular relative position along the vertical node face. Preferably, the position of the subcells and the position of the unit are the same using the nomenclature mentioned above. For example, a first modular circuit preferably comprises m number of subcells, each at the 15 position, and m number of units (each having m number of subunits) at the $1^{st}$ position. The second modular circuit to be overlaid on the first comprises m number of subcells, each at the $2^{nd}$ position, and m number of units (each having m number of subunits) at the $2^{nd}$ position. This can continue until after the me modular circuit is applied to the stack at which point all of the positions of the horizontal and vertical nodes will be occupied.

Accordingly, in a preferred embodiment, the present invention provides for an optical cross connect comprising n number of vertical nodes and n number of horizontal nodes, x number of trays, with m number of horizontal nodes in each tray, wherein n=xm and wherein each tray comprises at least: (a) a substrate, the substrate having first and second faces and having the following zones: (i) m number of cell positions substantially equally positioned along the first face, each cell position being divided into m number of subcell positions such that each subcell position has a corresponding subcell position in each of the other cells, sequential subcell positions within a given cell position corresponding to sequential numbers 1 to m; and (ii) m number of unit positions substantially equally positioned along the second face, sequential unit positions along the second face corresponding to sequential numbers from 1 to m, each unit position being divided into m subunit positions, wherein m is the number of horizontal nodes per tray; and (b) y number of optical circuits, wherein 1<y<m, each optical circuit comprising groupings of m number of optical pathways at a particular subcell position in each cell position, and groupings of m number of optical pathways at each subunit position in a particular unit position, wherein an optical pathway of each grouping at the subcell positions is common to a grouping in each subunit position, and wherein the particular subcell position and the particular unit position have the same particular number, each particular number of each optical circuit being different.

Preferably, in the optical cross connect described above, y is greater than 1. More preferably, the particular numbers for the optical circuits are sequential from 1 to y. In one embodiment, y=x, and the particular numbers for the optical circuits are sequential from 1 to x. In one embodiment, n=xm, and, in another embodiment, n=$m^2$. Preferably, m is greater than 2, more preferably, 2<m<64, even more preferably, 2 μm<16, yet even more preferably, 2≦m≦8, and still more preferably, m=8.

It is preferable for the fiber groupings of the subcells and subunits to be arranged on tabs, ribbonized or connectorized for easily handing. Although a horizontal node comprises x fold more fibers than a vertical node, it may be worthwhile to partition the number of fibers in the horizontal node into m groupings so that the fiber groupings of the horizontal and vertical nodes are similar to take advantage of economies of scale and minimize the number of different connectors, tab configurations, ribbonizing apparatus and fusing apparatus needed to terminate the fiber ends.

Aside from facilitating the modularization of the optical circuits, the optical circuit layouts described above also minimize the number of different optical circuits required by taking advantages of symmetry. More specifically, the layout protocol described above will necessarily result in each optical circuit being a mirror image of another optical circuit used in the tray. The table below shows that correspondence:

| Circuit Number | Circuit Number of Corresponding Mirror Image |
|---|---|
| 1 | m |
| 2 | m − 1 |
| 3 | m − 2 |
| . | . |
| . | . |
| . | . |
| m | 1 |

Since an optical circuit is preferably planar, it can typically be flipped over and used as its corresponding mirror image circuit. For example, circuit 1 may be flipped over and used as circuit m. It should be clear that by taking advantage of the circuit symmetry, the number of optical circuits required can be reduced. For example, if m=4, only two different circuits would be needed, likewise if m=8 only four different circuits would be needed.

Referring to FIGS. 4–9, a preferred embodiment of the present invention will be described in detail. FIG. 4 shows a preferred embodiment of the substrate used in the optical cross connect of the present invention. As shown, the substrate is a relatively simple device which merely supports one or more optical circuits in a particular row. In applications requiring a high number of tabs, it may be preferable to contour the tray to define tracks in which the tabs may lay and thereby remain organized and substantially secured relative to the substrate.

Figure 5:
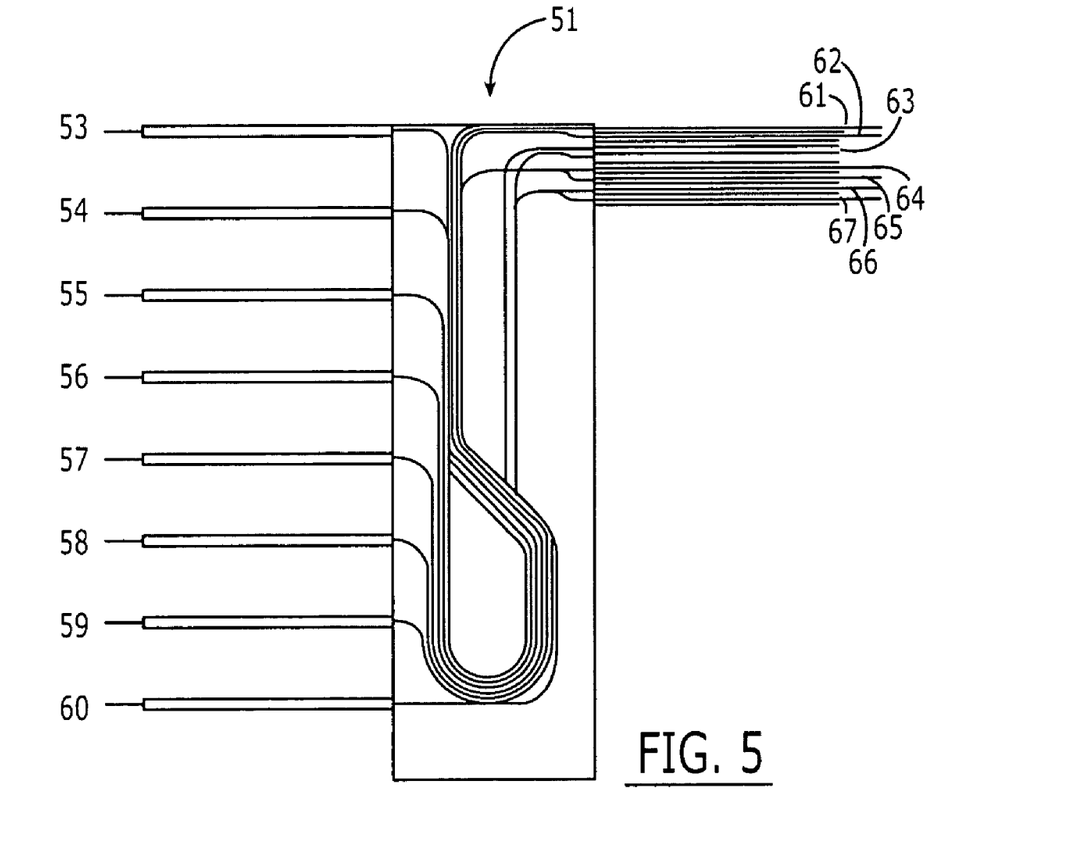
FIGS. 5–8 show modular optical circuits for placement in the substrate of FIG. 4.

Examples of optical circuits suitable for use in the optical cross-connect of the present invention are shown in FIGS. 5 through 8. In these examples, m=8. Referring to FIG. 5, the optical circuit 51 comprises a circuit substrate 51a upon which optical fibers are arranged in a set of tabs 61–67 for individual layers of 8 vertical nodes, and tabs 53 through 60 for eight horizontal nodes, respectively. Each grouping tab contains a number of fibers equal to m, that is, the multiple by which the system is scalable. For example in circuits that are scalable by a function of 8 (e.g. 8, 16, 32, 64) each tab would contain 8 fibers. Eight is a common factor by which the optical cross connect of the present invention is scalable since it is common in digital applications due to binary code. Preferably, the number of tabs in a set of input and output tabs of an optical circuit is equal to the multiple of scalability, for example, if the device is scalable by a factor of 8 nodes, then each optical circuit would contain 8 horizontal node tabs and 8 vertical node tabs. Accordingly, every fiber from each horizontal node tab is connected to a vertical node tab.

Figure 6:
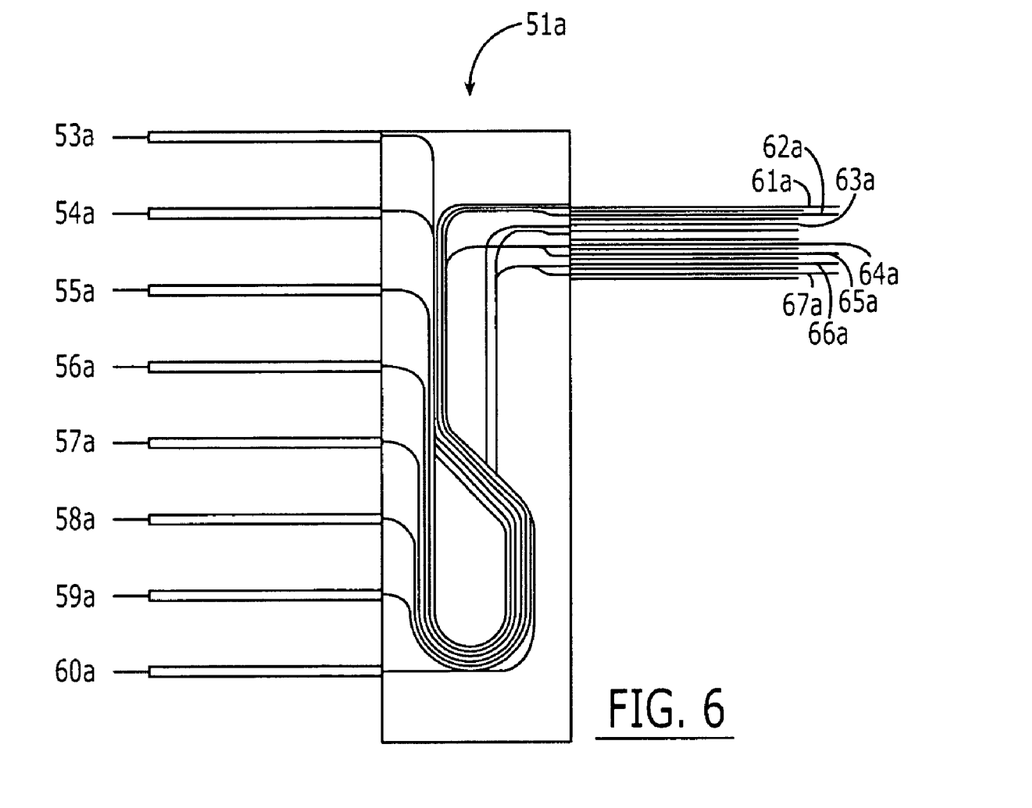
Figure 7:
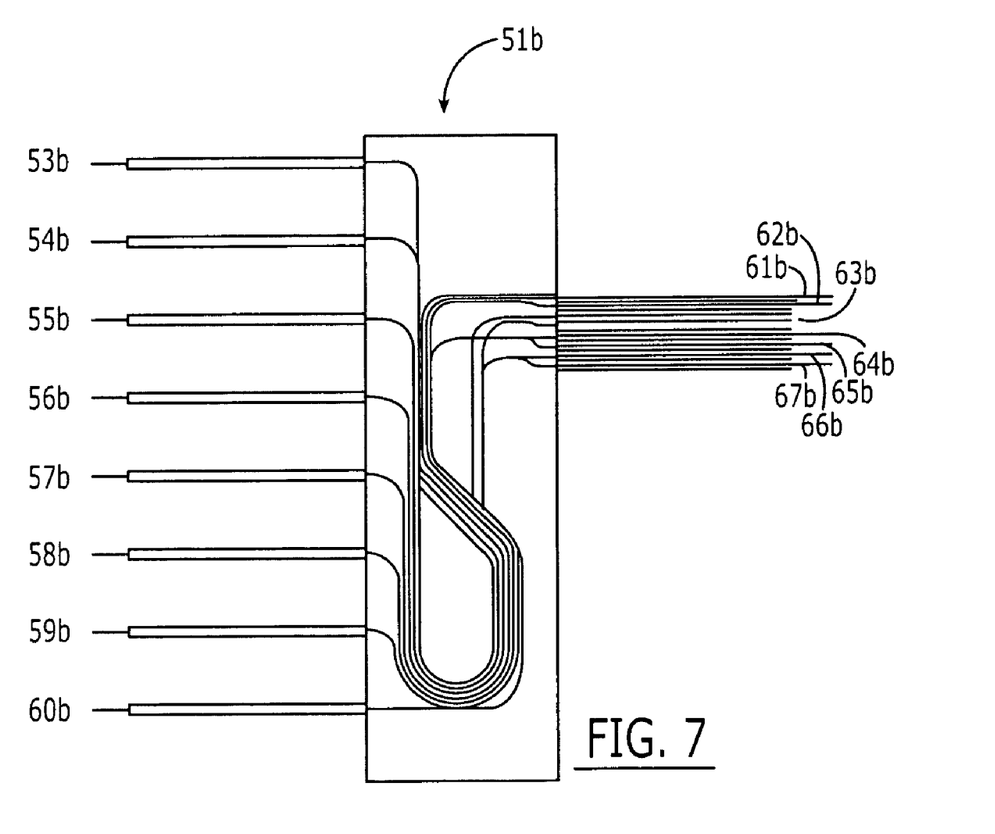
Figure 8:
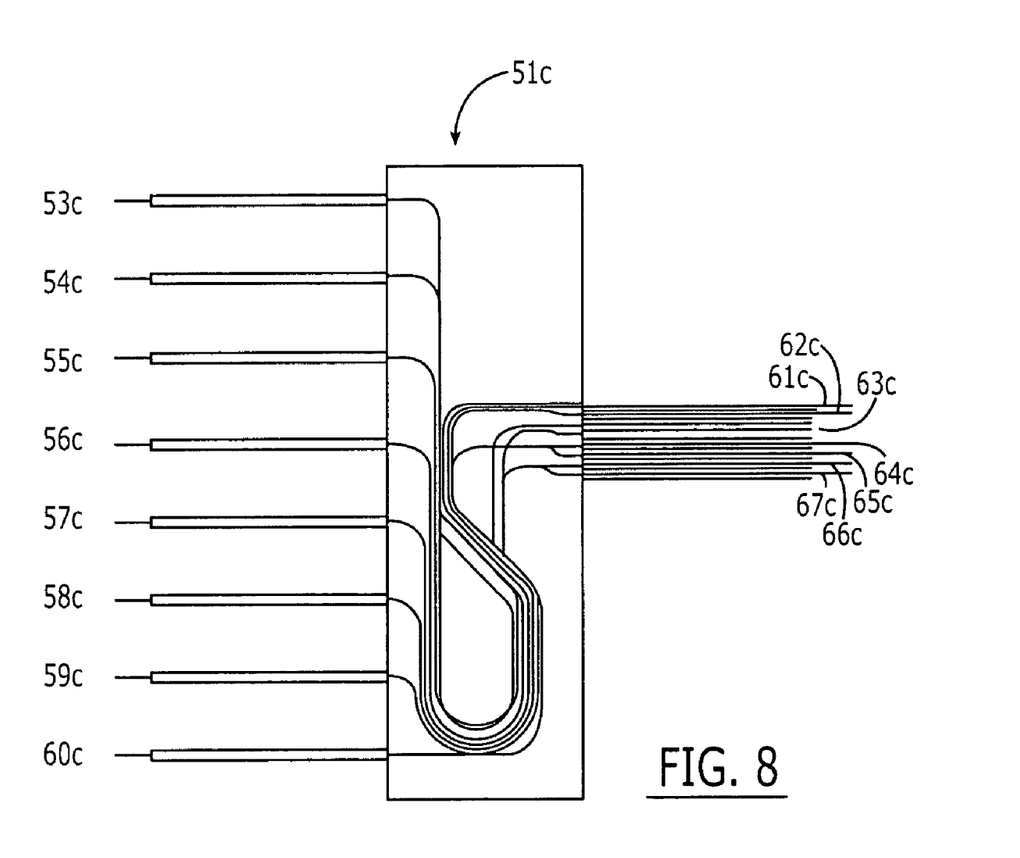

As mentioned above, this configuration promotes modularization. Specifically, with reference to FIG. 11, in the optical circuit of FIG. 5, the horizontal node tabs 53–54 are at the $1^{st}$ subcell position, while the vertical node tabs 61–67 are at the $1^{st}$ unit position. In the optical circuit of FIG. 6, the horizontal node tabs 53a–54a are at the $2^{nd}$ subcell position, while the vertical node tabs 61a–67a are at the $2^{nd}$ unit position. In the optical circuit of FIG. 7, the horizontal node tabs 53b–54b are at the $3^{rd}$ subcell position, while the vertical node tabs 61b–67b are at the $3^{nd}$ unit position. In the optical circuit of FIG. 8, the horizontal node tabs 53c–54c are at the $4^{th}$ subcell position, while the vertical node tabs 61c–67c are at the $4^{th}$ unit position. If the optical cell of FIG. 5 is flipped over, the horizontal node tabs 53–54 are at the $5^{th}$ subcell position, while the vertical node tabs 61–67 are at the $5^{th}$ unit position. If the optical cell of FIG. 6 is flipped over, the horizontal node tabs 53a–54a are at the 6' subcell position, while the vertical node tabs 61a–67a are at the $6^{th}$ unit position. If the optical cell of FIG. 7 is flipped over, the horizontal node tabs 53b–54b are at the $7^{th}$ subcell position, while the vertical node tabs 61b–67b are at the $7^{th}$ unit position. If the optical cell of FIG. 8 is flipped over, the horizontal node tabs 53c–54c are at the $8^{th}$ subcell position, while the vertical nodes tabs 61c–67c are at the $8^{th}$ unit position. It should be obvious that the optical circuits as described above may be stacked to populate an entire tray.

The optical circuits are designed preferably to optimize several design criteria. Specifically, the positioning of the input tabs and the output tabs are done so as to render the tabs of a given node contiguous either in the vertical direction or the horizontal direction. For example, in the optical fiber circuit of FIG. 5, when used in a top tray of a 64×64 node cross-connect, the grouping of tabs 61–67 would correspond to vertical nodes N'1 through N'8 respectively, while each of tabs 32–60 would correspond to horizontal nodes N1 through N8, respectively. As mentioned above, optical circuits need to consider minimum bend radiuses skew and fiber stacking issues. Given these design considerations, it is preferable to minimize the number of optical circuits used. For example, the 64×64 node system depicted in FIG. 3, employs just four different optical circuits. For example, to fill a tray (as is necessary in the 64×64 node design), optical fiber circuits of FIGS. 5 through 8 respectively are sequentially laid upon each other. Then, the optical circuits of FIGS. 8 through 5 respectively are laid upside down to fill the remaining space in the tray and complete the row.

Figure 9:
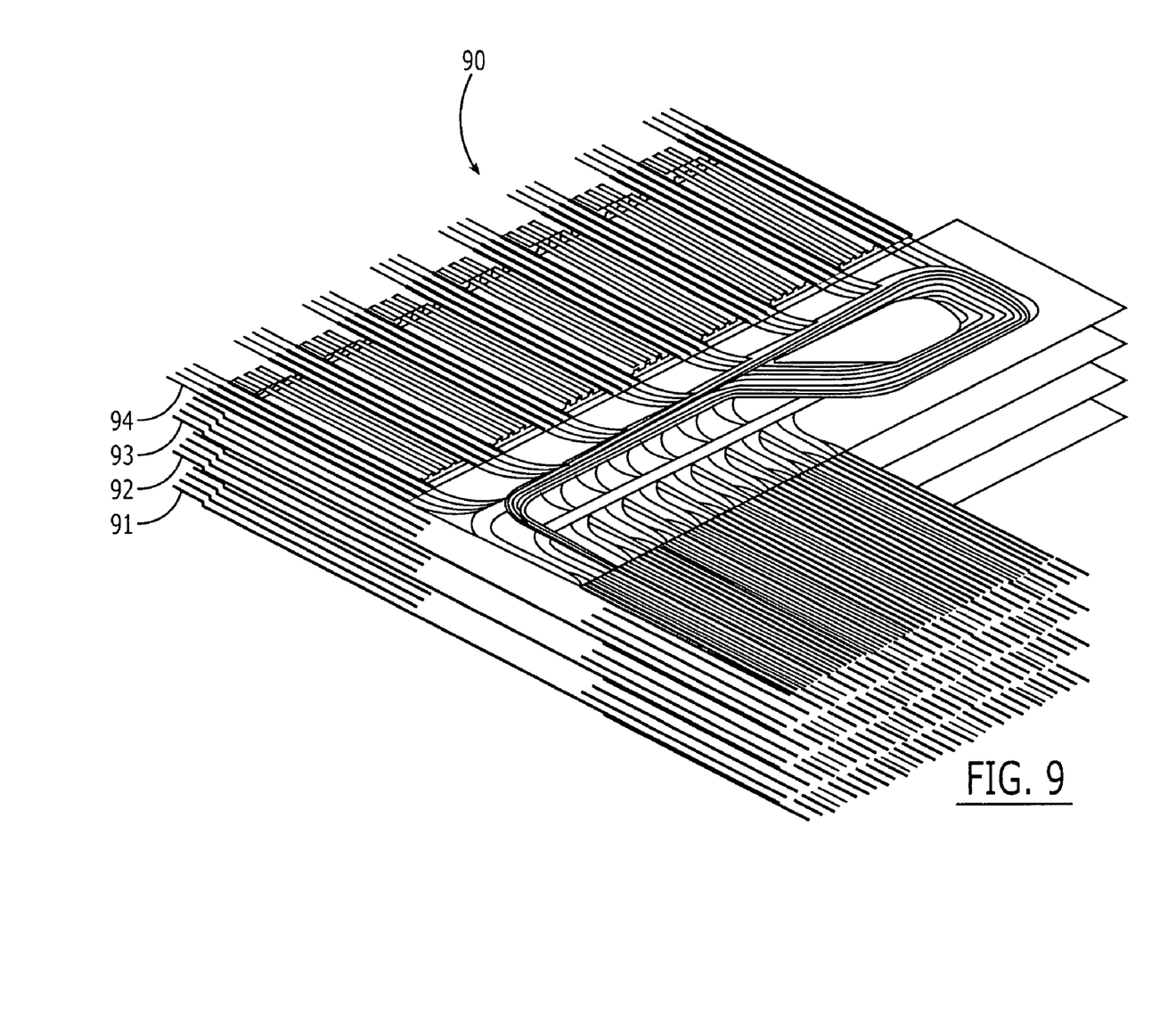
FIG. 9 shows a four-tray, 32×32 optical node cross connect having the same architecture of FIG. 3.

The system described above provides for scalability. System capacity can be increased simply by adding trays and additional optical circuits to each tray. For example, shown in FIG. 9, is a 32×32 mode optical cross-connect having 4 trays with 4 8×8 optical circuits in each tray. The following is a summary of 8×8 optical circuits and trays needed to achieve difference cross-connect capacity

| Nodes | Trays | 8x8 circuits/tray | Total Fibers |
|---|---|---|---|
| 8x8 | 1 | 1 | 64 |
| 16x16 | 2 | 2 | 256 |
| 32x32 | 4 | 4 | 1024 |
| 64x64 | 8 | 8 | 4096 |

It should be understood that the present invention is not limited to a particular configuration of an optical circuit and that rather than being affixed to a substrate the fibers may be ribbonized or otherwise manages to present groupings of fibers which are suitable for being combined with other groupings to form nodes. Furthermore, it should be recognized that the optical cross-connect of the present invention is not restricted by 8×8 optical circuits and can use an optical circuit of any type, e.g., 2×2, 3×3, 4×4, 10×10, etc.

What is claimed is:

1. An optical cross-connect system comprising two or more trays stacked vertically to define a first face and a second face, two or more optical circuits on each tray, each optical circuit comprising a module of a plurality of optical pathways, each having a first end at said first face and a second end at said second face, said first ends of each optical circuit arranged in one or more first groupings, each first groupings of an optical circuit corresponding to a different horizontal node, each first end of a particular first grouping corresponding to a particular second end, each particular second end corresponding to a different vertical node.

2. The optical cross-connect of claim 1, wherein said trays are removable.

3. The optical cross-connect of claim 1, wherein a given tray comprises at least two identical optical circuits.

4. The optical cross connect of claim 3, wherein one of said at least two identical circuits is up-side-down relative to the other.

5. The optical cross connect of claim 1, wherein said tray comprises:
   a substrate, said substrate having first and second faces and having the following zones:
   m number of cell positions substantially equally positioned along the first face, each cell position being divided into m number of subcell positions such that each subcell position has a corresponding subcell position in each of the other cells, sequential subcell positions within a given cell position corresponding to sequential numbers 1 to m; and
   m number of unit positions substantially equally positioned along said second face, sequential unit positions along said second face corresponding to sequential numbers from 1 to m, each unit position being divided into m subunit positions, wherein m is the number of horizontal nodes per tray:
   y number of optical circuits, wherein 1≦y≦m, each optical circuit comprising groupings of m number of optical pathways at a particular subcell position in each cell position, and groupings of m number optical pathways at each subunit position in a particular unit position, wherein an optical pathway of each grouping at said subcell positions is common to a grouping in each subunit position, and wherein said particular subcell position and said particular unit position have the same particular number, each particular number of each optical circuit being different.

6. The optical cross connect of claim 5, wherein the particular numbers for said optical circuits are sequential from 1 to y.

7. The optical cross connect of claim 5, wherein y=m.

8. The optical cross connect of claim 5, wherein said optical circuit having the particular number of 1 though m are symmetrical with the optical circuits having the particular number of, in decreasing order, m through 1, respectively.

9. The optical cross connect of claim 1, wherein said optical pathways are optical fibers.

10. The optical cross connect of claim 9, wherein each grouping of fibers is ribbonized.

11. The optical cross connect of claim 9, wherein individual groupings of fibers are on individual tabs.

12. The optical cross connect of claim 9, wherein each grouping is connectorized.

13. The optical cross connect of claim 9, wherein each optical circuit comprises a circuit substrate with optical fibers arranged thereon.

14. The optical cross connect of claim 1, wherein said particular second ends are spaced further apart than said particular first ends.

15. The optical cross connect of claim 1, wherein two or more first groupings of different optical circuits on the same tray correspond to one horizontal node.

16. The optical cross connect of claim 1, wherein only one second grouping on a tray corresponds to a given vertical node.

17. The optical cross connect of claim 16, wherein second groupings in a column on two or more trays correspond to a given vertical node.

18. The optical cross connect of claim 1, wherein said second ends of each optical circuit comprise two or more second groupings, each first end of each first grouping corresponding to a second end of each second grouping for a given optical circuit.

19. The optical cross connect of claim 18, wherein each optical circuit comprises m number of first groupings, m number of second groupings, each of said first and second groupings comprising m number of optical pathways, wherein there are y number of trays, 1≦y≦m, each tray comprising y number of optical circuits, each horizontal node comprising y number of first groupings of different optical circuits on a given tray, and each vertical node comprising y number of second groupings of different optical circuits on different trays.

20. The optical cross connect of claim 1, wherein m is 2 to 8 and y is 2 to 8.

21. An optical cross connect comprising n number of vertical nodes and n number of horizontal nodes, x number of trays, with m number of horizontal nodes in each tray, wherein n=xm and wherein each tray comprises at least:
- a substrate, said substrate having first and second faces and having the following zones:
- m number of cell positions substantially equally positioned along the first face, each cell position being divided into m number of subcell positions such that each subcell position has a corresponding subcell position in each of the other cells, sequential subcell positions within a given cell position corresponding to sequential numbers 1 to m; and
- m number of unit positions substantially equally positioned along said second face, sequential unit positions along said second face corresponding to sequential numbers from 1 to m, each unit position being divided into m subunit positions, wherein m is the number of horizontal nodes per tray; and
- y number of optical circuits, wherein $1 \leq y \leq m$, each optical circuit comprising groupings of m number of optical pathways at a particular subcell position in each cell position, and groupings of m number of optical pathways at each subunit position in a particular unit position, wherein an optical pathway of each grouping at said subcell positions is common to a grouping in each subunit position, and wherein said particular subcell position and said particular unit position have the same particular number, each particular number of each optical circuit being different.

22. The optical cross connect of claim 21, wherein the particular numbers for said optical circuits are sequential from 1 to y.

23. The optical cross connect of claim 21, wherein y=x.

24. The optical cross connect of claim 23, wherein the particular numbers for said optical circuits are sequential from 1 to x.

25. The optical cross connect of claim 21, wherein n=xm.

26. The optical cross connect of claim 24, wherein n=m².

27. The optical cross connect of claim 21, wherein $2 \leq m \leq 64$.

28. The optical cross connect of claim 24, wherein $2 \leq m \leq 8$.

29. An optical cross-connect system comprising two or more trays stacked vertically to define a first face and a second face, two or more optical circuits on each tray, each optical circuit comprising a plurality of optical pathways having one end at said first face and another end at said second face, such that said first and second faces present, respectively, rows and columns of said ends of said optical pathways, each row have two or more groupings of ends, wherein each grouping defines a horizontal node and each column of said ends defines a vertical node, wherein each tray comprises:
- a substrate, said substrate having first and second faces and having the following zones:
- m number of cell positions substantially equally positioned along the first face, each cell position being divided into m number of subcell positions such that each subcell position has a corresponding subcell position in each of the other cells, sequential subcell positions within a given cell position corresponding to sequential numbers 1 to m; and
- m number of unit positions substantially equally positioned along said second face, sequential unit positions along said second face corresponding to sequential numbers from 1 to m, each unit position being divided into m subunit positions, wherein m is the number of horizontal nodes per tray; and
- said optical circuits comprising at least a first optical circuit, said first optical circuit having groupings of m number of optical pathways at a particular subcell position in each cell position, and groupings of m number of optical pathways at each subunit position in a particular unit position, wherein an optical pathway of each grouping at said subcell positions is common to a grouping in each subunit position, and wherein said particular subcell position and said particular unit position have the same number.

30. The optical cross connect of claim 29, further comprising:
- at least a second optical circuit, said second optical circuit having groupings of m number of optical pathways at a second particular subcell position in each cell position, and groupings of in number of optical pathways at each subunit position in a second particular unit position, wherein an optical pathway of each grouping at said subcell positions is common to a grouping in each subunit position, and wherein said second particular subcell position and said second particular unit position have the same second number which is different from said same number.

* * * * *